(12) United States Patent
Xia et al.

(10) Patent No.: US 10,097,317 B2
(45) Date of Patent: Oct. 9, 2018

(54) DATA TRANSMISSION METHOD, APPARATUS AND SYSTEM, AND COMPUTER STORAGE MEDIUM

(71) Applicant: ZTE Corporation, Shenzhen, Guangdong (CN)

(72) Inventors: Shuqiang Xia, Shenzhen (CN); Jing Shi, Shenzhen (CN); Bo Dai, Shenzhen (CN); Qian Dai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 53 days.

(21) Appl. No.: 15/120,734

(22) PCT Filed: Aug. 26, 2014

(86) PCT No.: PCT/CN2014/085150
§ 371 (c)(1),
(2) Date: Aug. 22, 2016

(87) PCT Pub. No.: WO2015/127770
PCT Pub. Date: Sep. 3, 2015

(65) Prior Publication Data
US 2017/0012746 A1    Jan. 12, 2017

(30) Foreign Application Priority Data

Feb. 28, 2014  (CN) .......................... 2014 1 0073527

(51) Int. Cl.
*H04L 1/18* (2006.01)
*H04L 27/26* (2006.01)
*H04W 56/00* (2009.01)

(52) U.S. Cl.
CPC ........ *H04L 1/1887* (2013.01); *H04L 27/2607* (2013.01); *H04W 56/00* (2013.01)

(58) Field of Classification Search
CPC .................................................. H04L 1/1887
See application file for complete search history.

(56) References Cited

U.S. PATENT DOCUMENTS 7,764,661 B2 * 7/2010 Heo ...................... H04L 1/0007
370/235
8,396,068 B2 * 3/2013 Moon ................... H04L 5/0007
370/230
(Continued)

FOREIGN PATENT DOCUMENTS

CN       103532685 A     5/2007
CN       101114890 A     1/2008
(Continued)

OTHER PUBLICATIONS

"3GPP TS 36.321 v12.0.0 Technical Specification Group Radio Access Network; Evolved Universal Terrestrial Radio Access (E-UTRA); Medium Access Control (MAC) Protocol Specification", Dec. 2013, 3rd Generation Partnership Project, 57 pgs.

(Continued)

*Primary Examiner* — Warner Wong
(74) *Attorney, Agent, or Firm* — Cooper Legal Group, LLC

(57) ABSTRACT

A data sending method includes: sending data blocks by taking a TTI as a unit, wherein the TTI includes N symbols with cyclic prefixes, $T_{min}<=T<=T_{max}$, $Tmin=(13\times N\times L)/3$, $T_{max}=200/K$, N is a positive integer not smaller than 1 and not greater than formula (I), T represents the TTI, L represents an average value of the cyclic prefixes of the N symbols with cyclic prefixes, $L<=6$, formula (II) represents rounding down, K is a constant, $2<K<=7$, and the unit of each of T, L, $T_{min}$ and $T_{max}$ is microsecond (μs). Also provided are a data receiving method, a data transmission method, a data sending apparatus, a data receiving apparatus, a data transmission system, and a computer storage medium.

18 Claims, 5 Drawing Sheets

(56) References Cited

U.S. PATENT DOCUMENTS

| | | | | |
|---|---|---|---|---|
| 8,837,311 | B2* | 9/2014 | Martin | H04L 1/0001 370/252 |
| 9,781,747 | B2* | 10/2017 | Kim | H04W 74/0833 |
| 2009/0103447 | A1* | 4/2009 | Harada | H04L 1/1887 370/252 |
| 2009/0175245 | A1* | 7/2009 | Harada | H04L 1/0007 370/336 |
| 2010/0322229 | A1* | 12/2010 | Kim | H04L 5/0092 370/345 |
| 2011/0280208 | A1 | 11/2011 | Dehner | |
| 2012/0135773 | A1* | 5/2012 | Shen | H04L 5/0048 455/513 |
| 2014/0071954 | A1* | 3/2014 | Au | H04W 72/0446 370/336 |
| 2014/0226607 | A1* | 8/2014 | Holma | H04L 1/1812 370/329 |
| 2015/0188650 | A1* | 7/2015 | Au | H04J 3/1694 370/312 |
| 2015/0282178 | A1* | 10/2015 | Kim | H04B 7/2656 370/329 |

FOREIGN PATENT DOCUMENTS

| | | |
|---|---|---|
| CN | 101543125 A | 9/2009 |
| CN | 101547518 A | 9/2009 |
| CN | 103313400 A | 9/2013 |
| CN | 203338582 U | 12/2013 |
| WO | 2012018947 A1 | 2/2012 |
| WO | 2013116237 A1 | 8/2013 |

OTHER PUBLICATIONS

"Reliable and Real-Time Communication in Industrial Wireless Mesh Networks", 2011, Song Han, Xiuming Zhu, Aloysius E. Mok, Deji Chen and Mark Nixon, 17th IEEE Real-Time and Embedded echnology and Applications Symposium, 10 pgs.

"SPEED: a Stateless Protocol for Real-Time Communication in Sensor Networks", 2003, Tian He, John A Sankovic, Chenyang Lu and Tarek Abdelzaher, Proceedings of the 23rd International Conference on Distributed Computing Systems, 10 pgs.

"Frame Structure for IEEE 802.16m", Jan. 2008, Sungho Moon, Jin Sam Kwak, Wookbong Lee and Youngsoo Yak, IEEE 802/16 Broadbased Wireless Access Working Group, 18 pgs.

"Proposed 802.16m Frame Structure", Jan. 2008, Jaeweon Cho, Jaehee Cho, Tungsoo Kim, Rakesh Taori and Thierry Lestable, IEEE 802/16 Broadband Wireless Access Working Group, 14 pgs.

International Search Report in international application No. PCT/CN2014/085150, dated Nov. 28, 2014, 5 pgs.

English Translation of the Written Opinion of the International Search Authority in international application No. PCT/CN2014/085150, dated Nov. 28, 2014, 8 pgs.

Supplementary European Search Report in European application No. 14884228.9, dated Jan. 26, 2017, 5 pgs.

Wunder Gerhard et al: "5GN0W:non-orthogonal, asynchronous waveforms for future mobile applications", Feb. 2013, IEEE Communications Magazine, IEEE Service Center, Piscataway, US, vol. 52, No. 2, , XP011539680, ISSN: 0163-6804, DOI:10.1109/MCOM.2014.6736749 [retrieved on Feb. 10, 2014]* see in particular, chapters "5G Application Requirements", "Real Time Constraints" and "Achieving Very Short Latency" * pp. 97-105.

Wang Hualei et al: "Perspectives on high frequency small cell with ultra dense deployment", Oct. 2014, IEEE/CIC International Conference on Communications in China (ICCC), IEEE, XP032721697, DOI: 10.1109/ICCCHINA.2014.7008329 [retrieved on Jan. 12, 2015]* see chapter "II. New Waveform Design" ~, pp. 502-506.

Agyapong Patrick et al: "Design considerations for a 5G network architecture" Nov. 2014, IEEE Communications Magazine, IEEE Service Center, Piscataway, US, vol. 52, No. 11, XP011564611, ISSN: 0163-6804, DOI: 10.1109/MCOM.2014.6957145 [retrieved on Nov. 13, 2014]* see chapter "End-to-End Latency", pp. 65-75.

Xia Shuqiang et al: "Uplink control channel design for 5G ultra-low latency communication" Sep. 2016, 2016 IEEE 27th Annual International Symposium on Personal, Indoor, and Mobile Radio Communications (PIMRC), IEEE, XP033035319 DOI: 10.1109/PIMRC.2016.7794687, 6 pgs.

* cited by examiner

DATA TRANSMISSION METHOD, APPARATUS AND SYSTEM, AND COMPUTER STORAGE MEDIUM

TECHNICAL FIELD

The present disclosure relates to data transmission technologies in the field of communications, and in particular to a method, apparatus and system for data transmission, and a computer storage medium.

BACKGROUND

With improvement in commercial application of the 4th Generation (4G) mobile communication technology, such as, a Long-Term Evolution (LTE)/Long-Term Evolution Advance (LTE-Advance/LTE-A) system, higher and higher technical requirements are raised for the next generation communication technology, i.e., the 5th Generation (5G) mobile communication technology. It is widely recognized within industry that, the next generation mobile communication technology should have characteristics such as an ultra-high speed, an ultra-high capacity, an ultra-high reliability, and a transmission property with ultra-low delay.

Specifically, with respect to the delay transmission property, as shown in FIG. 1, in the conventional 2nd Generation (2G) mobile communication technology system, data transmission latency is greater than 100 ms, which allows achieving a communication effect with low delay in muscle response; in the 3rd Generation (3G) mobile communication technology system, data transmission delay is equal to 100 ms, which allows achieving a communication effect with low delay in sense of hearing; whereas, in the 4G system, data transmission delay is about 20 ms, which can achieve a communication effect with low delay in terms of vision.

However, in the mobile communication technology of each generation described above, technologies for achieving delayed transmission cannot meet the communication requirement for ultra-low delay in application scenarios, such as mobile 3D target, virtual reality, intelligent transportation, and smart power grid. In the above application scenarios, the data delay at the order of magnitude of 1 ms can be reached. FIG. 2 is a schematic view of breakdown of time delay of an ultra-low delay system. As can be seen from FIG. 2, for achieving 1 ms delay, optimized processing may be performed on higher-layer modules and physical-layer modules of a receiving side and a sending side.

Therefore, an urgent problem to be solved is how to design a proper transmission interval which enables the ultra-low delay transmission property of the next generation mobile communication technology system and takes account of the overload brought by a cyclic prefix.

SUMMARY

Embodiments of the present disclosure provide a method, apparatus, and a system for data transmission, and a computer storage medium, so as to solve the existing technical problems.

A data sending method is provided according to an embodiment of the present disclosure, including: a data block is sent at a Transmission Time Interval (TTI) which is taken as a unit, the TTI including N symbols, each of which has a cyclic prefix; in which:

$$T_{min} \leq T \leq T_{max};$$

$$T_{min} = (13 \times N \times L)/3;$$

$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of the T, L, $T_{min}$ and $T_{max}$ is μs.

In the embodiment, the symbols may be Orthogonal Frequency Division Multiplexing (OFDM) symbols, or Single Carrier Frequency Division Multiple Access (SC-FDMA) symbols or non-orthogonal symbols.

In the embodiment, the method may further include: the K is determined according to a processing capability of a sender and a processing capability of a receiver, before the data block is sent at the TTI which is taken as a unit.

In the embodiment, the method may further include: the L is determined according to a channel environment; or the L is determined according to an application scenario; or the L is determined according to a service characteristic of the sent data block, before the data block is sent at the TTI which is taken as a unit.

In the embodiment, the method may further include: the TTI is determined according to the determined L and K, before the data block is sent at the TTI which is taken as a unit.

In the embodiment, determining the TTI according to the determined L and K may include:

13 is multiplied with the L for obtaining a first value;

the first value is multiplied with the K for obtaining a second value;

600 is divided by the second value for obtaining a third value;

a round down operation is performed on the third value for obtaining a fourth value;

the first value is divided by 3 for obtaining a fifth value; and the fourth value is multiplied with the fifth value for obtaining the TTI.

In the embodiment, the method may further include: the TTI is determined according to the determined K before the data block is sent at the TTI which is taken as a unit.

In the embodiment, determining the TTI according to the determined K may include:

200 is divided by the K for obtaining the TTI.

In the embodiment, a Round-Trip Time (RTT) of a Hybrid Automatic Repeat Request (HARQ) supported by a communication system applied to the method is 200 μs at most.

In the embodiment, a sub-carrier interval of a communication system applied to the method is Δ, where 0.01 MHz<Δ≤7.5 MHz.

A data receiving method is provided according to an embodiment of the present disclosure, including: a data block is received at a TTI which is taken as a unit, the TTI including N symbols, each of which has a cyclic prefix, in which:

$$T_{min} \leq T \leq T_{max};$$

$$T_{min} = (13 \times N \times L)/3;$$

$$T_{max} = 100;$$

N is a positive integer not smaller than 1 and not greater than $\lfloor 600/(13KL) \rfloor$;

T represents the TTI, L represents an average value of cyclic prefixes of the N symbols, L≥6; $\lfloor \ \rfloor$ represents a round down operation, K is a constant, 2<K≤7; a unit of each of the T, L, $T_{min}$ and $T_{max}$ is μs.

A data transmission method is provided according to an embodiment of the present disclosure, including: a data block is sent at a TTI which is taken as a unit; and a data block is received at the TTI as a unit accordingly, wherein the TTI includes N symbols, each of which has a cyclic prefix; in which:

$$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of the T, L, $T_{min}$ and $T_{max}$ is μs.

A data sending apparatus is provided according to an embodiment of the present disclosure, including: a first determining module and a sending module, in which:

the first determining module is configured to send a TTI to the sending module;

the sending module is configured to send a data block at the TTI as a unit upon reception of the TTI sent by the first determining module, wherein the TTI includes N symbols, each of which has a cyclic prefix; in which:

$$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, and 2<K≤7; a unit of each of the T, L, $T_{min}$ and $T_{max}$ is μs.

In the embodiment, the first determining module may be further configured to determine the K according to a processing capability of a sender and a processing capability of a receiver.

In the embodiment, the first determining module may be further configured to determine the L according to a channel environment, or determine the L according to an application scenario, or determine the L according to a service characteristic of the sent data block.

In the embodiment, the first determining module may be further configured to determine the TTI according to the determined L and K.

In the embodiment, the first determining module may be further configured to determine the TTI according to the determined K.

In the embodiment, a RTT of a HARQ supported by a communication system applied to the method is 200 μs at most.

In the embodiment, a sub-carrier interval of a communication system applied to the apparatus is Δ, where 0.01 MHz<Δ≤7.5 MHz.

A data receiving apparatus is provided according to an embodiment of the present disclosure, including a second determining module and a receiving module, in which:

the second determining module is configured to send a TTI to the receiving module;

the receiving module is configured to receive a data block at the TTI as a unit, upon the reception of the TTI sent by the second determining module, wherein the TTI includes N symbols, each of which has a cyclic prefix; in which:

$$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, and 2<K≤7; a unit of each of the T, L, $T_{min}$ and $T_{max}$ is μs.

In the embodiment, a RTT of a HARQ supported by a communication system applied to the apparatus is 200 μs at most.

In the embodiment, a sub-carrier interval of a communication system applied to the apparatus is Δ, wherein 0.01 MHz<Δ≤7.5 MHz.

A data transmission system is provided, including a data sending apparatus and a data receiving apparatus, in which:

the data sending apparatus is configured to send a data block at a TTI as a unit; and the data receiving apparatus is configured to receive a data block at the TTI as a unit;

the TTI includes N symbols, each of which has a cyclic prefix; wherein $$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of the T, L, $T_{min}$ and $T_{max}$ is μs.

In the embodiment, the data sending apparatus may be further configured to determine the K according to a processing capability of a sender and a processing capability of a receiver, before the data block is sent at the TTI which is taken as a unit.

In the embodiment, the data sending apparatus may be further configured to determine the L according to channel environment, or determine the L according to an application scenario, or determine the L according to a service characteristic of the sent data block, before the data block is sent at the TTI which is taken as a unit.

In the embodiment, the data sending apparatus may be further configured to determine the TTI according to the determined L and K, before the data block is sent at the TTI which is taken as a unit.

In the embodiment, the data sending apparatus may be further configured to determine the TTI according to the determined K, before the data block is sent at the TTI which is taken as a unit.

In the embodiment, a RTT of a HARQ supported by a communication system applied to the system is 200 μs at most.

In the embodiment, a sub-carrier interval of a communication system applied to the method is Δ, wherein 0.01 MHz<Δ≤7.5 MHz.

A computer storage medium is provided, including a set of instructions, when executed, causing at least one processor to perform the data sending method described above, or perform the data receiving method described above, or perform the data transmission method described above.

With the method, apparatus and system for data transmission, as well as the computer storage medium according to the embodiments of the present disclosure, a data block is sent and received at a TTI which is taken as a unit, the TTI including N symbols, each of which has a cyclic prefix, in which:

$$T_{min} \leq T \leq T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of the T, L, $T_{min}$ and $T_{max}$ is μs. The technical solution of the embodiments of the present disclosure solves the technical problem that the maximum time budget of a physical layer is 100 μs when service transmission with ultra-low delay is applied in a next generation (5G) mobile communication system, thereby achieving ultra-low delay communication needed in application scenarios, such as mobile 3D target, virtual reality, intelligent transportation, smart power grid. In other words, with the technical solution of the present disclosure, an RTT of a data block is not greater than 200 μs, and the overload of a cyclic prefix is small and can be controlled to be within a range that is accepted by the communication system, thereby assuring low-delay communication needed for the ultra-low delay service in the communication system.

BRIEF DESCRIPTION OF THE DRAWINGS

In the drawings (which are not necessarily drawn to scale), similar reference numerals may describe similar components throughout in several figures. Similar reference numbers having different suffix letters may indicate different examples of similar components. The drawings generally illustrate various embodiments discussed herein by way of examples, but not for limitation, in which.

DETAILED DESCRIPTION

Figure 1:
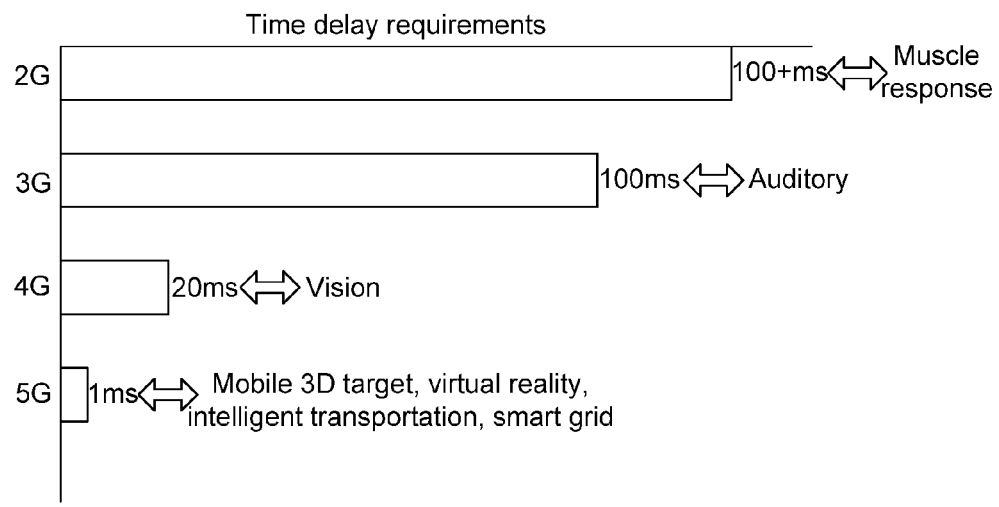
FIG. 1 is a schematic diagram of time delay requirements of different mobile communication systems.
Figure 2:
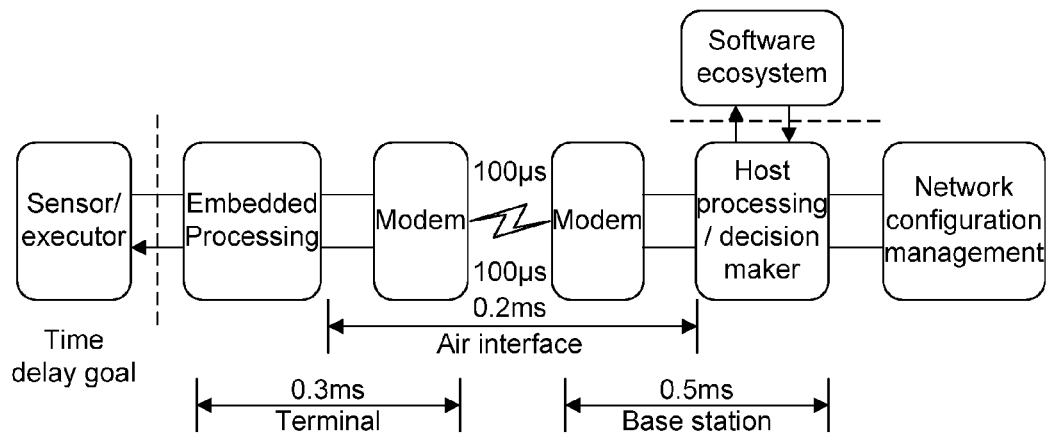
FIG. 2 is a schematic exploded view of time delay of an ultra-low delay system.

The present disclosure is further described in detail hereinafter in conjunction with following embodiments.

In each embodiment of the present disclosure, a data block is sent or received at a TTI which is taken as a unit; and the TTI includes N symbols, each of which has a cyclic prefix; in which:

$$T_{min} \leq T \leq T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of T, L, $T_{min}$ and $T_{max}$ is μs.

It is provided a data sending method according to an embodiment of the present disclosure, including: a data block is sent at a TTI as a unit, the TTI including N symbols, each of which has a cyclic prefix; in which:

$$T_{min} \leq T \leq T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of T, L, $T_{min}$ and $T_{max}$ is μs.

Specifically, the data block is sent by a transmitter of a base station or a terminal at the TTI as a unit.

The data block may be a data block of information about an ultra-low delay service or other data block; in which: the ultra-low delay service refers to a service which demands a data transmission delay to be within 1 ms, for example, services related to intelligent transportation, smart power grid, smart industry, intelligent medical treatment, mobile 3D target, virtual reality and the like.

The symbols may be OFDM symbols, or SC-FDMA symbols or non-orthogonal symbols.

The method may further include: before the data block is sent at the TTI which is taken as a unit, the L is determined according to a channel environment, or the L is determined according to an application scenario, or the L is determined according to a service characteristic of the sent data block, where a specific processing procedure for determining the L can be obtained from the prior art, which is not repeated here.

The method may further include: the K is determined according to a processing capability of a sender and a processing capability of a receiver, before the data block is sent at the TTI which is taken as a unit. In a practical application, assuming the TTI of the data block is T, the K is equal to a maximum duration for processing the data block by the sender and the receiver, generally between 2T and 7T.

The method may further include: the TTI is determined according to the determined L and K, before the data block is sent at the TTI which is taken as a unit; specifically, determining the TTI according to the determined L and K may include:

13 is multiplied with the L for obtaining a first value;

the first value is multiplied with the K for obtaining a second value;

600 is divided by the second value for obtaining a third value;

a round down operation is performed on the third value for obtaining a fourth value;

the first value is divided by 3 for obtaining a fifth value; and the fourth value is multiplied with the fifth value for obtaining the TTI.

Here, the above process for determining the TTL can be expressed by the following formula:

$$T = \frac{13L}{3} \left\lfloor \frac{600}{13KL} \right\rfloor.$$

The method may further include: the TTI is determined according to the determined K, before the data block is sent at the TTI which is taken as a unit, specifically, determining the TTI according to the determined K may include:

200 is divided by the K for obtaining the TTI.

Here, the above process for determining the TTL can be expressed by the following formula, $$T = 200/K.$$

In an embodiment, the N may be 1.

In an embodiment, the TTI may be 6.5 μs, 13 μs, or 28.6 μs or the like.

In an embodiment, a Round-Trip Time (RTT) of a Hybrid Automatic Repeat Request (HARQ) supported by a communication system applied to the method of embodiments of the present disclosure is 200 μs at most.

In an embodiment, a sub-carrier interval of a communication system applied to the method of embodiments of the present disclosure is Δ, wherein 0.01 MHz<Δ≤7.5 MHz. Specifically, the Δ may be 0.08 MHz, 0.16 MHz, 1.8 MHz or 3.6 MHz or the like.

It is further provided a data receiving method according to an embodiment of the present disclosure, including: a data block is received at a TTI as a unit, the TTI including N symbols, each of which has a cyclic prefix, in which:

$$T_{min} \leq T \leq T_{max};$$

$$T_{min} = (13 \times N \times L)/3;$$

$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of T, L, $T_{min}$ and $T_{max}$ is μs.

Specifically, the data block is sent by a transmitter of a base station or a terminal at the TTI which is taken as a unit.

The data block may be a data block of information about an ultra-low delay service or other data block; in which: the ultra-low delay service represents a service which demands a data transmission delay not larger than 1 ms, for example, services related to Intelligent transportation, smart power grid, smart industry, intelligent medical treatment, mobile 3D target, virtual reality and the like.

The symbols may be OFDM symbols, or SC-FDMA symbols or non-orthogonal symbols.

In an embodiment, the N may be 1.

In an embodiment, the TTI may be 6.5 μs, 13 μs, or 28.6 μs or the like.

In an embodiment, a RTT of a HARQ supported by a communication system applied to the method of embodiments of the present disclosure is 200 μs at most, in other words, the RTT of the HARQ supported by the communication system applied to the method of embodiments of the present disclosure cannot exceed 200 us.

In an embodiment, a sub-carrier interval of a communication system applied to the method of embodiments of the present disclosure is Δ, wherein 0.01 MHz<Δ≤7.5 MHz. Specifically, the Δ may be 0.08 MHz, 0.16 MHz, 1.8 MHz or 3.6 MHz or the like.

Figure 3:
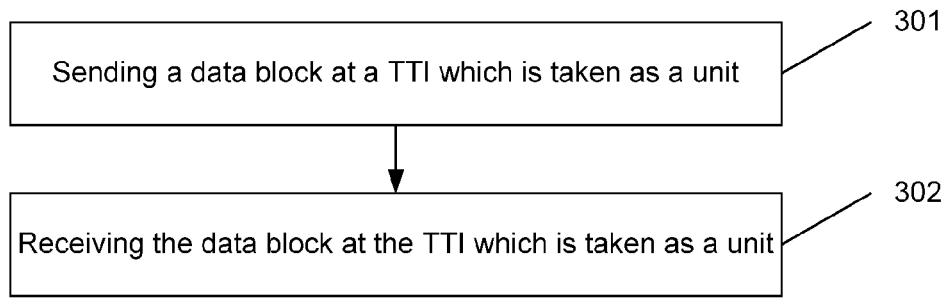
FIG. 3 is a schematic flow diagram of a data transmission method according to an embodiment of the present disclosure.

Based on the above data sending method and data receiving method, it is further provided a data transmission method according to an embodiment of the present disclosure, as shown in FIG. 3, this method including following steps:

step 301: a data block is sent at a TTI as a unit; and the TTI includes N symbols, each of which has a cyclic prefix; in which:

$$T_{min} \leq T \leq T_{max};$$

$$T_{min} = (13 \times N \times L)/3;$$

$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, 2<K≤7; a unit of each of T, L, $T_{min}$ and $T_{max}$ is μs.

Specifically, when a transmitter of a base station sends a data block at a TTI which is taken as a unit, a receiver of a terminal receives the data block at the TTI as a unit; when a transmitter of the terminal sends a data block at a TTI which is taken as a unit, a receiver of a base station receives the data block at the TTI as a unit.

The data block may be a data block of information about an ultra-low delay service or other data block not about ultra-low delay service information; in which: the ultra-low delay service refers to a service which demands a data transmission to be within 1 ms, for example, services related to Intelligent transportation, smart power grid, smart industry, intelligent medical treatment, mobile 3D target, virtual reality and the like.

The symbols may be OFDM symbols, or SC-FDMA symbols or non-orthogonal symbols.

The method may further include: the L is determined according to a channel environment, or the L is determined according to an application scenario, or the L is determined according to a service characteristic of the sent data block, before the data block is sent at the TTI which is taken as a unit, where a specific processing procedure for determining the L can be obtained from the prior art, which is not repeated herein.

The method may further include: the K is determined according to a processing capability of a sender and a processing capability of a receiver, before the data block is sent at the TTI which is taken as a unit. In a practical application, assuming the TTI of the data block is T, the K is equal to a maximum duration for processing the data block by the sender and the receiver, generally between 2T and 7T.

The method may further include: the TTI is determined according to the determined L and K, before the data block is sent at the TTI which is taken as a unit; specifically, determining the TTI according to the determined L and K may include:

13 is multiplied with the L for obtaining a first value;

the first value is multiplied with the K for obtaining a second value;

600 is divided by the second value for obtaining a third value;

a round down operation is performed on the third value for obtaining a fourth value;

the first value is divided by 3 for obtaining a fifth value; and the fourth value is multiplied with the fifth value for obtaining the TTI.

Here, the above process for determining the TTL can be expressed by the following formula:

$$T = \frac{13L}{3} \left\lfloor \frac{600}{13KL} \right\rfloor.$$

The method may further include: the TTI is determined according to the determined K before the data block is sent at the TTI which is taken as a unit, specifically, determining the TTI according to the determined K may include:

200 is divided by the K for obtaining the TTI.

Here, the above process for determining the TTL can be expressed by the following formula:

$$T = 200/K.$$

In an embodiment, the N may be 1.

In an embodiment, the TTI may be 6.5 µs, 13 µs, or 28.6 µs or the like.

Step 302 includes that the data block is received at the TTI as a unit.

Here, in an embodiment, a RTT of a HARQ supported by a communication system applied to the method of embodiments of the present disclosure is 200 µs at most; in other words, a RTT of a HARQ supported by a communication system applied to the method of embodiments of the present disclosure is not greater than 200 µs.

In an embodiment, a sub-carrier interval of a communication system applied to the method of embodiments of the present disclosure is $\Delta$, wherein $0.01\ MHz < \Delta \leq 7.5\ MHz$. Specifically, the $\Delta$ may be 0.08 MHz, 0.16 MHz, 1.8 MHz or 3.6 MHz or the like.

First Embodiment

Figure 4:
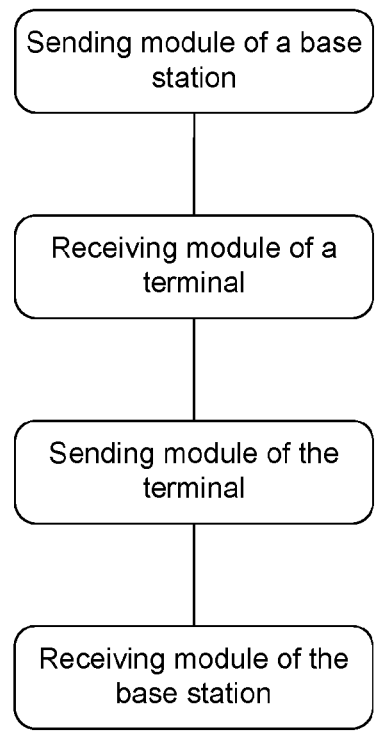
FIG. 4 is a schematic flow diagram of initiation of downlink transmission and completion of one RTT according to an embodiment of the present disclosure.

In the embodiment, as shown in FIG. 4 a communication system transmits a data block of an ultra-low delay service, initiates a downlink transmission and completes one RTT, i.e., a sending module of a base station sends the data block of an ultra-low delay service, then a receiving module of a terminal receives the data block of the ultra-low delay service from the base station, and then a sending module of the terminal sends the data block of the ultra-low delay service, and a receiving module of the base station finally receives the data block of the ultra-low delay service from the terminal.

Given a TTI for the communication system to implement data transmission with a 1 ms level delay (i.e., a service data transmission with an ultra-low delay) is T µs, one TTI includes N OFDM or SC-FDMA symbols, each of which has a cyclic prefix; an average value of cyclic prefixes of the N OFDM or SC-FDMA symbols is L µs.

In the embodiment, assuming that: the L is determined according to a channel environment, and L=0.5 µs, and the K is determined according to a processing capability of the sender and that of the receiver, here, it is assumed that K=7; according to the present disclosure, the maximum value of the N is $\lfloor 600/(13KL) \rfloor = 13$, assuming N=1, then $$T_{min} = (13 \times N \times L)/3 = (13 \times 1 \times 0.5)/3 = 2.14\ \mu s;$$

$$T_{max} = \frac{200}{K} = 28.57;$$

the T may be selected in a range between 2.14 µs and 28.57 µs, assuming T is 13 µs.

According to the processing capability of the base station and that of the terminal, a processing time of each portion of a physical layer is set in following manner:

a processing time of the sending module of the base station is T µs;

a processing time of the receiving module of the terminal is 2T µs;

a processing time of the sending module of the terminal is T µs;

a processing time of the receiving module of the base station is 3T µs;

a and then T+2T+T+3T=D.

The D represents a delay of the physical layer for completing one RTT transmission, including a processing time of the base station, a processing time of the terminal and an air interface delay during a round trip of data, and the like.

In the embodiment, if T=13 µs, then D=91 µs.

Figure 5:
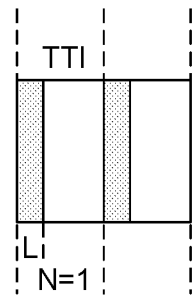
FIG. 5 is a schematic structural diagram of a first TTI according to an embodiment of the present disclosure.

In the embodiment, as shown in FIG. 5, N is 1, that is to say, each TTI includes one OFDM symbol or SC-FDMA symbol. Assuming sub-carrier interval of a communication system with an ultra-low delay is $\Delta$ MHz, then:

$$\Delta = \frac{N}{T-NL};$$

since L=0.5 µs, the sub-carrier interval is 0.08 MHz according to the above formula.

In this case, the overhead of the cyclic prefix is L/T=0.5/13=3.8%.

It can be seen from the above description, in this embodiment, taking account of the processing time of the sending side and the receiving side, the transmitting time for completing one RTT is 91 µs, so that the RTT of the data block is not greater than 200 µs; moreover, the overhead of the cyclic prefix is only 3.8%, which is controlled to be within the range that can be accepted by the communication system (the maximum overhead of the cyclic prefix accepted by the communication system is 30%), therefore, low-delay communication needed for the ultra-low delay service can be realized in the communication system.

Second Embodiment

Figure 6:
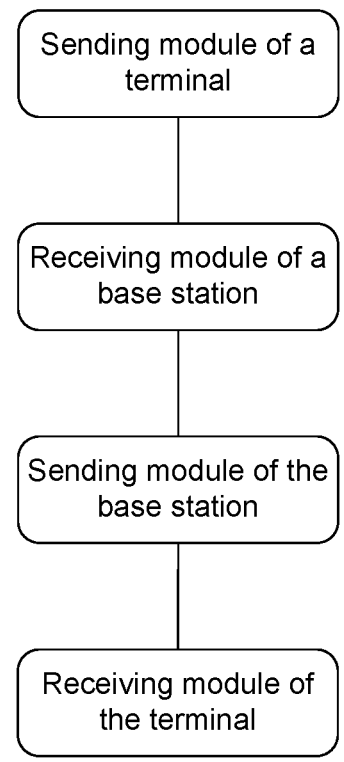
FIG. 6 is a schematic flow diagram of initiation of uplink transmission and completion of one RTT according to an embodiment of the present disclosure.

In the embodiment, as shown in FIG. 6 a communication system transmits a data block of an ultra-low delay service, initiates an uplink transmission and completes one RTT, i.e., a sending module of a terminal first sends the data block of the ultra-low delay service, then a receiving module of a base station receives the data block of the ultra-low delay service from the base station, and then a sending module of the base station sends the data block of the ultra-low delay service, and a receiving module of the terminal finally receives the data block of the ultra-low delay service sent by the terminal.

Given a TTI for the communication system to implement a data transmission with a 1 ms level delay (i.e., a service data transmission with an ultra-low delay) is T µs, one TTI includes N OFDM or SC-FDMA symbols, each of which has a cyclic prefix; an average value of cyclic prefixes of the N OFDM or SC-FDMA symbols is L µs.

In the embodiment, assuming that: N=1, and L=0.25 µs, and the K is determined according to the processing capability of the sender and that of the receiver, here, it is assumed K=7, then, $$T_{min} = (13 \times N \times L)/3 = (13 \times 1 \times 0.25)/3 = 1.08 \ \mu s,$$

$$T_{max} = \frac{200}{K} = 28.57;$$

the T may be selected in a range between 1.08 µs and 28.57 µs, assuming T is 6.5 µs.

According to the processing capability of the base station and that of the terminal, a processing time of each portion of a physical layer is set in following manner:

a processing time of the sending module of the base station is T µs;

a processing time of the receiving module of the terminal is T µs;

a processing time of the sending module of the terminal is T µs;

a processing time of the receiving module of the base station is 4T µs;

and then T+T+T+4T=D.

The D represents a delay of the physical layer for completing one RTT transmission, including a processing time of the base station, a processing time of the terminal and an air interface delay during a round trip of data, and the like.

In the embodiment, since T=6.5 µs, and D=45.5 µs.

In the embodiment, as shown in FIG. 5, N is 1, that is to say, each TTI includes one OFDM symbol or SC-FDMA symbol. Assuming a sub-carrier interval of a communication system with an ultra-low delay is Δ MHz, then:

$$\Delta = \frac{N}{T-NL};$$

since L=0.25 µs, the sub-carrier interval is 0.16 MHz according to the above formula.

In this case, the overhead of the cyclic prefix is L/T=0.25/6.5=3.8%.

It can be seen from the above description, in this embodiment, taking account of the processing time of the sending side and that of the receiving side, the transmitting time for completing one RTT is 45.5 µs, so that the RTT of the data block is not greater than 200 µs; moreover, the overhead of the cyclic prefix is only 3.8%, which is controlled within the range that can be accepted by the communication system (the maximum overhead of the cyclic prefix accepted by the communication system is 30%), therefore, low-delay communication can be implemented for the ultra-delay service in the communication system.

Third Embodiment

In the embodiment, as shown in FIG. 4 a communication system transmits a data block of an ultra-low delay service, initiates a downlink transmission and completes one RTT, i.e., a sending module of a base station sends the data block of the ultra-low delay service, then a receiving module of a terminal receives the data block of the ultra-low delay service from the base station, and then a sending module of the terminal sends the data block of the ultra-low delay service, and a receiving module of the base station finally receives the data block of the ultra-low delay service from the terminal.

Given a TTI for the communication system to implement a data transmission with a 1 ms level delay (i.e., a service data transmission with an ultra-low delay) is T µs, here, assuming T=200/K; the K is determined according to the processing capability of the sender and that of the receiver; it is assumed K=6, then, T=200/6=33.33 µs.

one TTI includes N OFDM or SC-FDMA symbols, each of which has a cyclic prefix; an average value of cyclic prefixes of the N OFDM or SC-FDMA symbols is L µs. In the embodiment, assuming L=1 µs, then, N≤⌊600/(13KL)⌋=7, here N=5.

According to the processing capability of the base station and that of the terminal, a processing time of each portion of a physical layer is set in following manner:

a processing time of the sending module of the base station is T µs;

a processing time of the receiving module of the terminal is 2T µs;

a processing time of the sending module of the terminal is T µs;

a processing time of the receiving module of the base station is 2T µs;

and then T+2T+T+2T=D.

The D represents a delay of the physical layer for completing one RTT transmission, including a processing time of the base station, a processing time of the terminal and an air interface delay during a round trip of data, and the like. In the embodiment, if T=33.33 µs, then D=200 µs.

Figure 7:
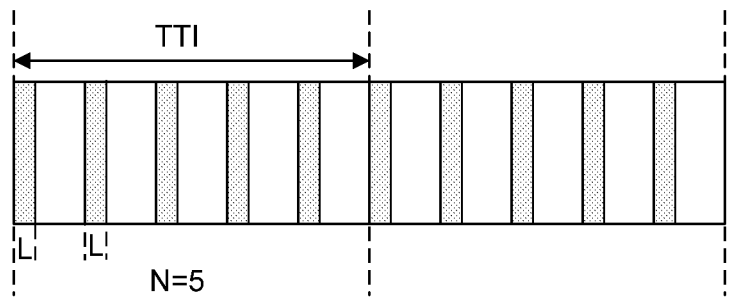
FIG. 7 is a schematic structural diagram of a second TTI according to an embodiment of the present disclosure.

In the embodiment, as shown in FIG. 7, N is 5, that is to say, each TTI includes 5 OFDM symbols or SC-FDMA symbols, a cyclic suffix of each symbol is L µs, i.e., an average value of cyclic prefixes of the 5 OFDM or SC-FDMA symbols is L µs. Assuming a sub-carrier interval of a communication system with an ultra-low delay is Δ MHz, then:

$$\Delta = \frac{N}{T - NL};$$

since L=1 µs, the sub-carrier interval is 0.21 MHz according to the above formula.

In this case, the overhead of the cyclic prefix is 5 L/T=1*5/28.57=17.5%.

It can be seen from the above description, in this embodiment, taking account of the processing time of the sending side and that of the receiving side, the transmitting time for completing one RTT is 200 µs, so that the RTT of the data block is not greater than 200 µs; moreover, the overhead of the cyclic prefix is only 17.5%, which is controlled in the range that can be accepted by the communication system (the maximum overhead of the cyclic prefix accepted by the communication system is 30%), therefore, low-delay communication can be achieved for the ultra-delay service in the communication system.

Fourth Embodiment

In the embodiment, as shown in FIG. 4 a communication system transmits a data block of an ultra-low delay service, initiates a downlink transmission and completes one RTT, i.e., a sending module of a base station sends the data block of the ultra-low delay service, then a receiving module of a terminal receives the data block of the ultra-low delay service from the base station, and then a sending module of the terminal sends the data block of the ultra-low delay service, and a receiving module of the base station finally receives the data block of the ultra-low delay service from the terminal.

Given a TTI of the communication system for implementing data transmission with a 1 ms level delay (i.e., a service data transmission with an ultra-low delay) is T µs, one TTI includes N OFDM or SC-FDMA symbols, each of which has a cyclic prefix; an average value of cyclic prefixes of the N OFDM or SC-FDMA symbols is L µs.

In the embodiment, assuming that: the L is determined according to a channel environment, and L=0.5 µs; the K is determined according to the processing capability of the sender and that of the receiver, and K=5; according to the present disclosure, the maximum value of the N is $\lfloor 600/(13KL) \rfloor$=18, assuming N=5, then $$T_{min} = (13 \times N \times L)/3 = (13 \times 5 \times 0.5)/3 = 10.83 \text{ µs},$$

$$T_{max} = \frac{200}{K} = 40;$$

the T may be selected in a range between 10.83 µs and 40 µs, assuming T is 20 µs.

According to the processing capability of the base station and that of the terminal, a processing time of each portion of a physical layer is set in following manner:

a processing time of the sending module of the base station is T µs;

a processing time of the receiving module of the terminal is T µs;

a processing time of the sending module of the terminal is T µs;

a processing time of the receiving module of the base station is 2T µs;

and then T+T+T+2T=D.

The D represents a delay of the physical layer for completing one RTT transmission, including a processing time of the base station, a processing time of the terminal and an air interface delay during a round trip of data, and the like. In the embodiment, if T=20 µs, then, D=100 µs.

Figure 8:
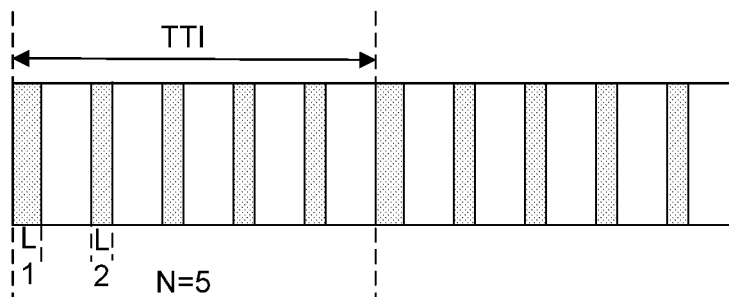
FIG. 8 is a schematic structural diagram of a third TTI according to an embodiment of the present disclosure.

In the embodiment, as shown in FIG. 8, N is 5, that is to say, each TTI includes 5 OFDM symbols or SC-FDMA symbols, an average value of cyclic prefix of each symbol is L=0.5 µs, a cyclic prefix of each symbol is 0.54 µs, 0.49 µs, 0.49 µs, 0.49 µs, 0.49 µs respectively. Assuming a sub-carrier interval of a communication system with an ultra-low delay is Δ MHz, then:

$$\Delta = \frac{N}{T - NL};$$

since L=0.5 µs, the sub-carrier interval is 0.29 MHz according to the above formula.

In this case, the overhead of the cyclic prefix is 5 L/T=5*0.5/20=12.5%.

It can be seen from the above description, in this embodiment, taking account of the processing time of the sending side and that of the receiving side, the transmitting time for completing one RTT is 100 µs, so that the RTT of the data block is not greater than 200 µs; moreover, the overhead of the cyclic prefix is only 12.5%, which is controlled in the range that can be accepted by the communication system (the maximum overhead of the cyclic prefix accepted by the communication system is 30%), therefore, low-delay communication can be realized for the ultra-delay service in the communication system.

Figure 9:
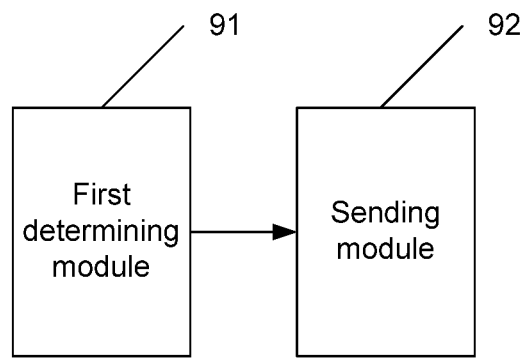
FIG. 9 is a schematic structural diagram of a data sending apparatus according to an embodiment of the present disclosure.

Based on the data sending method described above, it is further provided a data sending apparatus according to an embodiment of the present disclosure, the data sending apparatus may be located in a base station or a terminal, as shown in FIG. 9, the data sending apparatus includes: a first determining module 91 and a sending module 92, in which:

the first determining module 91 is configured to send a TTI to the sending module 92;

the sending module 92 is configured to send a data block at the TTI which is taken as a unit, upon the reception of the TTI sent by the first determining module 91, wherein the TTI includes N symbols, each of which has a cyclic prefix; in which:

$$T_{min} \le T \le T_{max};$$

$$T_{min} = (13 \times N \times L)/3;$$

$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, and 2<K≤7; a unit of each of T, L, $T_{min}$ and $T_{max}$ is µs.

The data block may be a data block of information about an ultra-low delay service or other data block not related to ultra-low delay service information, wherein the ultra-low delay service refers to a service which demands a data transmission delay to be within 1 ms, for example, services related to Intelligent transportation, smart power grid, smart industry, intelligent medical treatment, mobile 3D target, virtual reality and the like.

The symbols may be OFDM symbols, or SC-FDMA symbols or non-orthogonal symbols.

The first determining module 91 may be further configured to determine the L according to a channel environment, or determine the L according to an application scenario, or determine the L according to a service characteristic of the sent data block, where a specific processing procedure for determining the L can be obtained from the prior art, which is not repeated herein.

The first determining module 91 may be further configured to determine the K according to a processing capability of a sender and a processing capability of a receiver. In a practical application, assuming the TTI of the data block is T, the K is equal to a maximum duration for processing the data block by the sender and the receiver, generally between 2T and 7T.

The first determining module 91 may be further configured to determine the TTI according to the determined L and K, specifically, 13 is multiplied with the L for obtaining a first value;

the first value is multiplied with the K for obtaining a second value;

600 is divided by the second value for obtaining a third value;

a round down operation is performed on the third value for obtaining a fourth value;

the first value is divided by 3 for obtaining a fifth value; and the fourth value is multiplied with the fifth value for obtaining the TTI.

Here, the above process for determining the TTL can be expressed by the following formula, $$T = \frac{13L}{3} \left\lfloor \frac{600}{13KL} \right\rfloor.$$

The first determining module 91 may be further configured to determine the TTI according to the determined K; specifically, 200 is divided by the K for obtaining the TTI.

Here, the above process for determining the TTL can be expressed by the following formula, $$T=200/K.$$

In an embodiment, the N may be 1.

In an embodiment, the TTI may be 6.5 μs, 13 μs, or 28.6 μs or the like.

In an embodiment, a RTT of a HARQ supported by a communication system applied to the method of embodiments of the present disclosure is 200 μs at most; in other words, a RTT of a HARQ supported by a communication system applied to the method of embodiments of the present disclosure is not greater than 200 μs.

In an embodiment, a sub-carrier interval of a communication system applied to the method of embodiments of the present disclosure is Δ, wherein 0.01 MHz<Δ≤7.5 MHz. Specifically, the Δ may be 0.08 MHz, 0.16 MHz, 1.8 MHz or 3.6 MHz or the like.

It should be noted that, in a practical application, the first determining module may be implemented by a Central Processing Unit (CPU), a Digital Signal Processor (DSP) or a Field-Programmable Gate Array (FPGA) in the data sending apparatus; and the sending module may be implemented by a transmitter in the data sending apparatus.

Figure 10:
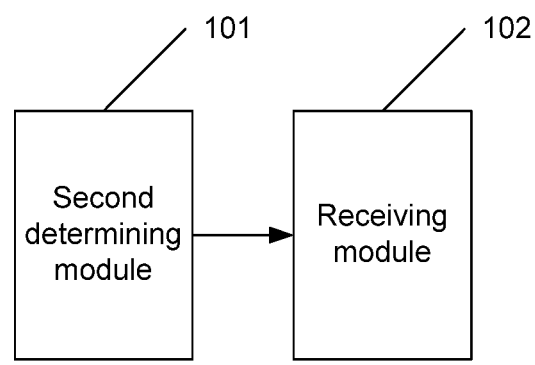
FIG. 10 is a schematic structural diagram of a data receiving apparatus according to an embodiment of the present disclosure.

Based on the data sending method described above, it is further provided a data receiving apparatus according to an embodiment of the present disclosure, the data sending apparatus may be located in a base station or a terminal, as shown in FIG. 10, the data receiving apparatus includes: a second determining module 101 and a receiving module 102, in which:

the second determining module 101 is configured to send a TTI to the receiving module 102;

the receiving module 102 is configured to receive a data block at the TTI which is taken as a unit, upon the reception of the TTI from the second determining module 101, wherein the TTI includes N symbols, each of which has a cyclic prefix; in which:

$$T_{min} \leq T \leq T_{max};$$

$$T_{min} = (13 \times N \times L)/3;$$

$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant, and 2<K≤7; a unit of each of T, L, $T_{min}$ and $T_{max}$ is μs.

The data block may be a data block of information about an ultra-low delay service or other data block not about ultra-low delay service information, wherein the ultra-low delay service refers to a service which demands a data transmission delay to be within 1 ms, for example, services related to Intelligent transportation, smart power grid, smart industry, intelligent medical treatment, mobile 3D target, virtual reality and the like.

The symbols may be OFDM symbols, or SC-FDMA symbols or non-orthogonal symbols.

In an embodiment, the N may be 1.

In an embodiment, the TTI may be 6.5 μs, 13 μs, or 28.6 μs or the like.

In an embodiment, a RTT of a HARQ supported by a communication system applied to the method of embodiments of the present disclosure is 200 μs at most; in other words, a RTT of a HARQ supported by a communication system applied to the method of embodiments of the present disclosure is not greater than 200 μs.

In an embodiment, a sub-carrier interval of a communication system applied to the method of embodiments of the present disclosure is Δ, wherein 0.01 MHz<Δ≤7.5 MHz. Specifically, the Δ may be 0.08 MHz, 0.16 MHz, 1.8 MHz or 3.6 MHz or the like.

It should be noted that, in a practical application, the first determining module may be implemented by a CPU, a DSP or an FPGA in the data receiving apparatus; and the sending module may be implemented by a transmitter in the data receiving apparatus.

Figure 11:
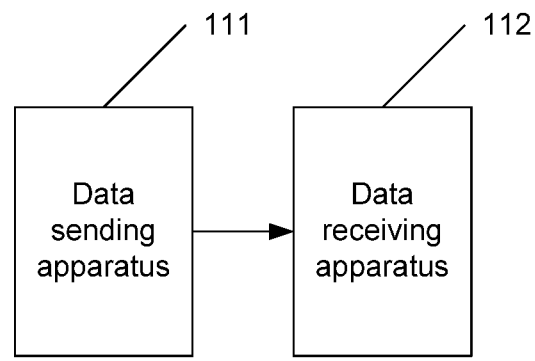
FIG. 11 is a schematic structural diagram of a data transmission system according to an embodiment of the present disclosure.

Based on the data sending apparatus and the data receiving apparatus described above, it is further provided a data transmission system according to an embodiment of the present disclosure, as shown in FIG. 11, the system includes: a data sending apparatus 111 and a data receiving apparatus 112; in which:

the data sending apparatus 111 is configured to send a data block at a TTI as a unit; and the data receiving apparatus 112 is configured to receive a data block at the TTI as a unit;

the TTI includes N symbols, each of which has a cyclic prefix; wherein $$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, $L \le 6$; $\lfloor \ \rfloor$ represents a round down operation, K is a constant, $2 < K \le 7$; a unit of each of T, L, $T_{min}$ and $T_{max}$ is µs.

Specifically, a first determining module of the data sending apparatus 111 sends the TTI to a sending module of the data sending apparatus 111, and then the sending module sends a data block at the TTI as a unit, and then a second determining muddle of the data receiving apparatus 112 sends the TTI to a receiving module of the data receiving apparatus, and then the receiving module receives the data block at the TTI which is taken as a unit.

In a practical application, the data sending apparatus 111 is located in a base station or a terminal, correspondingly, the data receiving apparatus 112 is located in a terminal or a base station; specifically, when the data sending apparatus 111 is located in a base station, the corresponding data receiving apparatus 112 is located in a terminal, while when the data sending apparatus 111 is located in a terminal, the corresponding data receiving apparatus 112 is located in a base station. Generally, in order to perform data interaction between the base station and the terminal, both the base station and the terminal include the data sending apparatus 111 and the data receiving apparatus 112.

The data block may be a data block of information about an ultra-low delay service or other data block not about ultra-low delay service information, wherein the ultra-low delay service refers to a service which demands a data transmission delay to be within 1 ms, for example, services about Intelligent transportation, smart power grid, smart industry, intelligent medical treatment, mobile 3D target, virtual reality and the like.

The symbols may be OFDM symbols, or SC-FDMA symbols or non-orthogonal symbols.

The data sending apparatus 111 may be further configured to determine the L according to a channel environment, or determine the L according to an application scenario, or determine the L according to a service characteristic of the sent data block, before the data block is sent at the TTI which is taken as a unit, where a specific processing procedure for determining the L can be obtained from the prior art, which is not repeated herein.

Specifically, before the data block is sent at the TTI which is taken as a unit, the first determining module is configured to determine the L according to a channel environment, or determine the L according to an application scenario, or determine the L according to a service characteristic of the sent data block.

The data sending apparatus 111 may be further configured to determine the K according to a processing capability of a sender and a processing capability of a receiver, before sending the data block at the TTI which is taken as a unit. In a practical application, assuming the TTI of the data block is T, the K is equal to a maximum duration for processing the data block by the sender and the receiver, generally between 2T and 7T.

The data sending apparatus 111 may be further configured to determine the TTI according to the determined L and K, before sending the data block at the TTI which is taken as a unit; specifically, 13 is multiplied with the L for obtaining a first value;

the first value is multiplied with the K for obtaining a second value;

600 is divided by the second value for obtaining a third value;

a round down operation is performed on the third value for obtaining a fourth value;

the first value is divided by 3 for obtaining a fifth value; and the fourth value is multiplied with the fifth value for obtaining the TTI.

Here, the above process for determining the TTL can be expressed by the following formula, $$T = \frac{13L}{3} \left\lfloor \frac{600}{13KL} \right\rfloor.$$

The data sending apparatus 111 may be further configured to the TTI is determined according to the determined K, before sending the data block at the TTI which is taken as a unit, specifically, 200 is divided by the K for obtaining the TTI.

Here, the above process for determining the TTL can be expressed by the following formula, $$T = 200/K.$$

In an embodiment, the N may be 1.

In an embodiment, the TTI may be 6.5 µs, 13 µs, or 28.6 µs or the like.

Here, in an embodiment, a RTT of a HARQ supported by a communication system applied to the method of embodiments of the present disclosure is 200 µs at most; in other words, a RTT of a HARQ supported by a communication system applied to the method of embodiments of the present disclosure is not greater than 200 µs.

In an embodiment, a sub-carrier interval of a communication system applied to the method of embodiments of the present disclosure is $\Delta$, wherein $0.01 \text{ MHz} < \Delta \le 7.5 \text{ MHz}$. Specifically, the $\Delta$ may be 0.08 MHz, 0.16 MHz, 1.8 MHz or 3.6 MHz or the like.

Those skilled in the art should understand that the embodiments of the present disclosure may be provided as a method, a system or a computer program product. Therefore, the present disclosure may adopt a form of a pure hardware embodiment, a pure software embodiment and a combined software and hardware embodiment. Moreover, the present disclosure may adopt a form of computer program product implemented on one or more computer-available storage media (including, but not limited to, a disk memory, an optical memory and the like) including computer-available program codes.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable equipment.

What are described above are only preferred embodiments of the present disclosure, but are not used for limiting the protection scope of the present disclosure.

The invention claimed is:

1. A data sending method, comprising:
   determining a Transmission Time Interval (TTI) for processing a data block;
   sending, by a base station, the data block at the determined TTI which is taken as a unit to a terminal, the data block at the TTI comprising N symbols, each of which has a cyclic prefix, wherein $T_{min} \leq T \leq T_{max}$;
   $T_{min} = (13 \times N \times L)/3$;
   $T_{max} = \dfrac{200}{K}$;

N is a positive integer not smaller than 1 and not greater than $\lfloor 600/(13KL) \rfloor$;
   T represents the TTI, L represents an average value of cyclic prefixes of the N symbols, $L \leq 6$; $\lfloor \ \rfloor$ represents a round down operation, K is a constant and corresponds to a processing capability of a sender and a processing capability of a receiver, $2 < K \leq 7$; a unit of each of the T, L, $T_{min}$ and $T_{max}$ is μs; and
   receiving, by the terminal, the data block from the base station;
   wherein the step of determining the TTI for processing the data block comprises:
   determining K according to the processing capability of the sender and the processing capability of the receiver, wherein the sender is located in the base station, and the receiver is located in the terminal.

2. The method according to claim 1, wherein the symbols are Orthogonal Frequency Division Multiplexing (OFDM) symbols, or Single Carrier Frequency Division Multiple Access (SC-FDMA) symbols or non-orthogonal symbols.

3. The method according to claim 1, wherein the step of determining the TTI for processing the data block further comprises:
   determining the L according to a channel environment; or determining the L according to an application scenario; or determining the L according to a service characteristic of the sent data block.

4. The method according to claim 3, wherein the step of determining the TTI for processing the data block further comprises:
   determining the TTI according to the determined L and K.

5. The method according to claim 4, wherein determining the TTI according to the determined L and K comprises:
   multiplying 13 with the L for obtaining a first value;
   multiplying the first value with the K for obtaining a second value;
   dividing 600 by the second value for obtaining a third value;
   performing a round down operation on the third value for obtaining a fourth value;
   dividing the first value by 3 for obtaining a fifth value; and
   multiplying the fourth value with the fifth value for obtaining the TTI.

6. The method according to claim 1, wherein the step of determining the TTI for processing the data block further comprises:
   determining the TTI according to the determined K.

7. The method according to claim 6, wherein determining the TTI according to the determined K comprises:
   dividing 200 by the K for obtaining the TTI.

8. The method according to claim 1, wherein a Round-Trip Time (RTT) of a Hybrid Automatic Repeat Request (HARQ) supported by a communication system applied to the method is 200 μs at most;
   or,
   a sub-carrier interval of a communication system applied to the method is Δ, wherein 0.01 MHz<Δ≤7.5 MHz.

9. A data receiving method, comprising:
   determining a Transmission Time Interval (TTI) for processing a data block;
   receiving, by a terminal, the data block at the determined TTI as a unit from a base station, the TTI comprising N symbols, each of which has a cyclic prefix, wherein $T_{min} \leq T \leq T_{max}$;
   $T_{min} = (13 \times N \times L)/3$;
   $T_{max} = \dfrac{200}{K}$;

N is a positive integer not smaller than 1 and not greater than $\lfloor 600/(13KL) \rfloor$;
   T represents the TTI, L represents an average value of cyclic prefixes of the N symbols, $L \leq 6$; $\lfloor \ \rfloor$ represents a round down operation, K is a constant and corresponds to a processing capability of a sender and a processing capability of a receiver, 2<K≤7; a unit of each of the T, L, $T_{min}$ and $T_{max}$ is µs;

wherein the step of determining the TTI for processing the data block comprises:

determining K according to the processing capability of the receiver and the processing capability of the sender, wherein the sender is located in the base station, and the receiver is located in the terminal.

10. The method according to claim 9, wherein the symbols are Orthogonal Frequency Division Multiplexing (OFDM) symbols, or Single Carrier Frequency Division Multiple Access (SC-FDMA) symbols or non-orthogonal symbols; or a Round-Trip Time (RTT) of a Hybrid Automatic Repeat Request (HARQ) supported by a communication system applied to the method is 200 µs at most; or a sub-carrier interval of a communication system applied to the method is Δ, wherein 0.01 MHz<Δ≤7.5 MHz.

11. A data sending apparatus, comprising a first determining module and a sending module; wherein the first determining module is configured to determine a Transmission Time Interval (TTI) for processing a data block, and send the determined TTI to the sending module; and the sending module is configured to, upon receiving the TTI from the first determining module, send the data block at the TTI which is taken as a unit, wherein the TTI comprises N symbols, each of which has a cyclic prefix; wherein $$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant and corresponds to a processing capability of a sender and a processing capability of a receiver, and 2<K≤7; a unit of each of the T, L, $T_{min}$ and $T_{max}$ is µs;

wherein the first determining module is further configured to determine K according to the processing capability of the sender and the processing capability of the receiver, wherein the sender is located in a base station, and the receiver is located in a terminal.

12. The apparatus according to the claim 11, wherein the first determining module is further configured to determine the L according to a channel environment; or determine the L according to an application scenario; or determine the L according to a service characteristic of the sent data block.

13. The apparatus according to the claim 12, wherein the first determining module is further configured to determine the TTI according to the determined L and K.

14. The apparatus according to the claim 11, wherein the first determining module is further configured to determine the TTI according to the determined K.

15. The apparatus according to claim 11, wherein a Round-Trip Time (RTT) of a Hybrid Automatic Repeat Request (HARQ) supported by a communication system applied to the method is 200 µs at most; or a sub-carrier interval of a communication system applied to the apparatus is Δ, wherein 0.01 MHz<Δ≤7.5 MHz.

16. A data receiving apparatus, comprising a second determining module and a receiving module; wherein the second determining module is configured to determine a Transmission Time Interval (TTI) for processing a data block, and send the determined TTI to the receiving module; and the receiving module is configured to, upon receiving the TTI from the second determining module, receive the data block at the TTI which is taken as a unit, wherein the TTI comprises N symbols, each of which has a cyclic prefix; wherein $$T_{min} \le T \le T_{max};$$
$$T_{min} = (13 \times N \times L)/3;$$
$$T_{max} = \frac{200}{K};$$

N is a positive integer not smaller than 1 and not greater than $\lfloor 600/(13KL) \rfloor$;

T represents the TTI, L represents an average value of cyclic prefixes of the N symbols, L≤6; $\lfloor \ \rfloor$ represents a round down operation, K is a constant and corresponds to a processing capability of a sender and a processing capability of a receiver, and 2<K≤7; a unit of each of the T, L, $T_{min}$ and $T_{max}$ is µs;

wherein the second determining module is further configured to determine K according to the processing capability of the sender and the processing capability of the receiver, wherein the sender is located in a base station, and the receiver is located in a terminal.

17. The apparatus according to claim 16, wherein a Round-Trip Time (RTT) of a Hybrid Automatic Repeat Request (HARQ) supported by a communication system applied to the apparatus is 200 µs at most; or a sub-carrier interval of a communication system applied to the apparatus is Δ, wherein 0.01 MHz<Δ≤7.5 MHz.

18. A non-transitory computer storage medium, comprising a set of instructions, when executed, causing at least one processor to perform the data sending method according to claim 1.

* * * * *